United States Patent [19]

Gamon et al.

[11] Patent Number: 4,935,483

[45] Date of Patent: Jun. 19, 1990

[54] HEAT-VULCANIZABLE ORGANOPOLYSILOXANE COMPOSITIONS

[75] Inventors: Norbert Gamon, Seevetal; Ferdinand Pradl, Burghausen; Bernd Pachaly, Burghausen; Volker Frey, Burghausen, all of Fed. Rep. of Germany

[73] Assignee: Wacker-Chemie GmbH, Munich, Fed. Rep. of Germany

[21] Appl. No.: 229,039

[22] Filed: Aug. 4, 1988

[30] Foreign Application Priority Data

Aug. 5, 1987 [DE] Fed. Rep. of Germany ....... 3726010

[51] Int. Cl.[5] ........................ C08G 77/60; C08G 77/64

[52] U.S. Cl. ........................................ 528/31; 528/24; 528/32; 528/34; 525/478

[58] Field of Search ........................ 528/24, 32, 31, 34; 556/430; 525/478

[56] References Cited

U.S. PATENT DOCUMENTS

| | | | |
|---|---|---|---|
| 4,667,046 | 5/1987 | Frey et al. | 556/430 |
| 4,755,554 | 7/1988 | Itoh et al. | 524/588 |
| 4,771,099 | 9/1988 | Itoh et al. | 524/862 |

FOREIGN PATENT DOCUMENTS 60-120755 6/1985 Japan .

*Primary Examiner*—John C. Bleutge
*Assistant Examiner*—Rålph H. Dean, Jr.

[57] ABSTRACT

The invention relates to heat-vulcanizable compositions containing an organopolysiloxane and from 0.01 to 10 parts by weight of an organo(poly)silane per 100 parts by weight of organopolysiloxane.

1 Claim, No Drawings

HEAT-VULCANIZABLE ORGANOPOLYSILOXANE COMPOSITIONS

The present invention relates to organopolysiloxane compositions and more particularly to organopolysiloxane compositions which vulcanize at elevated temperatures and at atmospheric pressure to form elastomers which are free of bubbles.

BACKGROUND OF THE INVENTION

Organopolysiloxane compositions which can be vulcanized at temperatures of from 200° to 400° C. at substantially atmospheric pressure to form a tack free surface without bubbling are described in U.S. Pat. No. 2,723,966 to Youngs. The organopolysiloxane compositions described in the above patent consist of organopolysiloxanes containing methylpolysiloxanes in which up to 30 mol percent of the organopolysiloxanes consist of a copolymerized siloxane of phenylmethylsiloxane, diphenylsiloxane, methylvinylsiloxane and phenylvinylsiloxane, a filler and a dichlorobenzoyl peroxide containing two chlorine atoms per benzoyl radical. Japanese Patent Application 60-120,755 (published June 28, 1985, M. Fukushima, Shin-Etsu Chemical Co.) and Japanese Patent Application JP-A 60-120,754 (published June 28, 1985, K. Numata, Shin-Etsu Chemical Co.) describe heat-vulcanizable silicone rubber compositions which contain, in addition to the organopolysiloxane to be vulcanized and an organic peroxide, at least one polysilane, polysilalkylenesiloxane and/or polyphenylenesiloxane, in which each have at least two Si-H groups per molecule.

Therefore, it is an object of the present invention to provide organopolysiloxane compositions which vulcanize at elevated temperatures without liberating toxic polyhalogenated aromatic compounds during or after vulcanization and which are substantially free of discoloration. Another object of the present invention is to provide organopolysiloxanes which vulcanize at elevated temperatures that do no contain toxic polyhalogenated aromatic compounds. A further object of the present invention is to provide heat vulcanizable organopolysiloxane compositions which are substantially free of hydrolysissensitive Si-H groups.

SUMMARY OF THE INVENTION

The foregoing objects and others which are apparent from the following description are accomplished in accordance with this invention, generally speaking, by providing heat-vulcanizable organopolysiloxane compositions containing an organopolysiloxane and from 0.01 to 10 parts by weight of an organo(poly)silane per 100 parts by weight of the organopolysiloxane in which the organo(poly)silane is represented by the formula $$R'_2R'''Si-[(SiR'''R'')_p(SiR''')_q]X$$

in which the R' radicals represent the same or different monovalent, optionally halogenated alkyl, alkenyl or aryl groups having from 1 to 18 carbon atoms, R'' represent the same or different alkyl groups having from 1 to 18 carbon atoms; R''' represent the same or different $C_1$- to $C_6$-alkoxy groups or R' radicals; X represents a hydrogen atom or a $C_1$- to $C_6$-alkoxy group, and p and q are integers whose sum is at least 1.

DESCRIPTION OF THE INVENTION

The organopolysiloxanes present in the organopolysiloxane compositions of this invention may be any type of organopolysiloxanes which have been or could have been used heretofore in heat-vulcanizable compositions. These are, in particular, organopolysiloxanes which have units of the formula $$R_nSiO_{\frac{4-n}{2}} \quad (I)$$

where R is the same or different monovalent radicals containing hydrogen, nitrogen, oxygen, halogen and up to 18 carbon atoms, and n is a number having a value of 0, 1, 2 or 3. The radicals represented by R are preferably the same or different monovalent hydrocarbon radicals and substituted monovalent hydrocarbon radicals having up to 12 carbon atoms. The R radicals may also be substituted with halogen atoms, cyano radicals, amino and mercapto groups. Preferably, n has an average value of from 1.8 to 2.2.

Examples of unsubstituted radicals represented by R are alkyl radicals, such as the methyl, ethyl, n-propyl, isopropyl, n-butyl, isobutyl, tert-butyl, n-pentyl, isopentyl, neo-pentyl, tert-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; alkenyl radicals, such as the vinyl and allyl radicals; cycloalkyl radicals, such as the cyclopentyl, cyclohexyl, cycloheptyl and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the alpha- and $\beta$-phenylethyl radicals.

Examples of substituted radicals represented by R are cyanoalkyl radicals, such as the $\beta$-cyanoethyl radical, and halogenated hydrocarbon radicals, for example, haloalkyl radicals, such as the 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Preferred radicals represented by R are $C_1$- to $C_6$-alkyl radicals, vinyl radicals and phenyl radicals. At least 80 percent of the R radicals in the organopolysiloxanes represented by formula (I) are preferably methyl groups.

In addition to one or more types of organopolysiloxanes, especially those of formula (I), the organopolysiloxane compositions of this invention also contain organo(poly)silanes of the formula $$R'_2R'''Si-[(SiR'''R'')_p(SiR''')_q]X \quad (II)$$

in which the R' radicals represent the same or different monovalent alkyl, alkenyl or aryl groups having from 1 to 18 carbon atoms or halogenated alkyl, alkenyl or aryl groups having from 1 to 18 carbon atoms, R'' represent the same or different alkyl groups having 1 to 18 carbon atoms; R''' represent the same or different $C_1$- to $C_6$-alkoxy groups or R' radicals; X represents a hydrogen atom or a $C_1$- to $C_6$-alkoxy group, and p and g are integers whose sum is at least 1.

Preferably the radicals represented by R' are the same or different $C_1$- to $C_4$- alkyl radicals, $C_2$- to $C_3$alkenyl radicals and phenyl radicals; R'' represents $C_1$- to $C_4$- alkyl radicals; R''' represents the methoxy group or more preferably an R' radical; X represents the methoxy group, and the sum of p and q is a value of from 2 to 1000.

The preparation of organo(poly)silanes having the above formula are known and described, for example, in European Patent No. 214,664 (published May 18, 1987, B. Pachaly et al, Wacker-Chemie GmbH). They are obtained, for example, by reacting organoalkoxydisilanes with organohydrogensilanes in the presence of alkali metal alkoxides. The organoalkoxydisilanes can themselves be prepared by reacting the organohalodisilanes produced as the bottom product in the Rochow synthesis with alkali metal alkoxides.

Instead of, or in addition to, the two components mentioned above, namely organopolysiloxanes, especially those of formula (I), and organo(poly)silanes of formula (II), the organopolysiloxane compositions of this invention can also contain copolymers which comprise both siloxane units of formula (I) and structural units of the organo(poly)silane of formula (II), i.e., units of the formulas (SiR'''R'') and (SiR''').

The organo(poly)silanes of formula (II) or copolymers having structural units of the organo(poly)silanes act as the vulcanizing agent. The addition of an additional vulcanizing agent is not necessary. This is especially true when the organopolysiloxane compositions of this invention are to be vulcanized in the presence of oxygen, for example in the presence of air.

However, it may be advisable in some cases to add additional vulcanizing agents to the organo(poly)silanes of formula (II). These are particularly organic peroxides, especially those which do not contain haloaryl radicals, such as, for example, dibenzoyl peroxide, di-tert-butyl peroxide, tert-butyl perbenzoate, tert-butylperoxyphenyl carbonate, 2,5-dimethyl-2,5-(di-tert-butylperoxy)hexane, 1,1-bis(tert-butylperoxy)-3,3,5-trimethylcyclohexane, dicumyl peroxide and organosilicon compounds containing peroxy groups.

The organopolysiloxane compositions of this invention contain from 0.01 to 10 percent by weight, preferably from 0.1 to 5 percent by weight, and more preferably from 0.3 to 2 percent by weight, of organo(poly)silanes of formula (II), based on the weight of the organopolysiloxane employed.

The organopolysiloxane compositions of this invention preferably contain from 0 to 5 percent by weight, and more preferably from 0 to 2 percent by weight, of additional vulcanizing agents, especially organic peroxides, based on the weight of the organopolysiloxane employed.

In addition to the components mentioned above, the organopolysiloxane compositions of this invention may contain additional substances, such as fillers, plasticizers, pigments, UV absorbers and other similar substances.

Examples of fillers which may be added to the compositions are non-reinforcing fillers, i.e., fillers having a BET surface area of up to 50 $m^2/g$, such as quartz, diatomaceous earth, calcium silicate, zirconium silicate, zeolites, metal oxide powders, such as aluminum oxide, titanium oxide, iron oxide or zinc oxide, or mixed oxides of these metals, barium sulphate, calcium carbonate, gypsum, silicon nitride, silicon carbide, boron nitride, glass and plastic powders; reinforcing fillers, i.e., fillers having a BET surface area of more than 50 $m^2/g$, such as pyrogenically prepared silica, precipitated silica, carbon black, such as furnace black and acetylene black, and mixed oxides of silicon and aluminum having a large BET surface area; fibrous fillers, such as asbestos and plastic fibres. The fillers may be rendered hydrophobic, for example, by treatment with organosilanes or organosiloxanes, or by etherification of hydroxyl groups to form alkoxy groups. It is possible to employ only one type of filler or mixtures of at least two fillers may be employed.

The organopolysiloxane compositions of this invention can be vulcanized at elevated temperatures to form elastomers. The temperature and time which are necessary for complete vulcanization depend, inter alia, on the amount of the organo(poly)silane of formula (II) and on the type and amount of the additional vulcanizing agents, for example, an organic peroxide, employed in the organopolysiloxane compositions of this invention.

The compositions of this invention are preferably vulcanized at temperatures of from 60° to 800° C., and more preferably from 100° C. to 450° C.

The duration of the vulcanization of the compositions of this invention is very dependent on the curing temperature and on the coating thickness or wall thickness. In the temperature ranges mentioned above, times of from 10 seconds to 400 seconds, more preferably from 15 seconds to 200 seconds, are generally required for vulcanizing the compositions of this invention at a coating thickness of from about 1 to 5 mm.

The vulcanization can be carried out at atmospheric pressure, i.e., at about 0.1 MPa (abs.), but can also be carried out at increased or reduced pressures. Pressures of from 0.05 to 50 MPa (abs.), and more preferably from 0.09 to 25 MPa (abs.), may be used.

The organopolysiloxane compositions of this invention preferably contain less than 100 ppm by weight, and more preferably less than 50 ppm by weight, of organosilicon compounds containing at least 2 hydrogen atoms which are bonded directly to a silicon atom per molecule, based on the weight of the organopolysiloxanes. The organopolysiloxane compositions of this invention preferably contain less than 10 ppm by weight, and more preferably less than 5 ppm by weight, of iron fatty acid salts, based on the weight of the organopolysiloxanes.

In the following examples, all quantities are by weight, unless otherwise specified. If no pressure is indicated, the process step was carried out under atmospheric pressure, i.e., at a pressure between 0.09 and 0.11 MPa (abs.). If no temperature is indicated, the reaction was carried out at 20° to 25° C.

Examples:

Preparation of organosilane (A):

To a mixture containing 930 g of 1,1,2-trimethyl1,2,2-trimethoxydisilane (4.79 mol) and 6 g of dimethylmethoxysilane are added 0.6 g of sodium methoxide and then warmed rapidly from 40° C. to 96° C. After 10 minutes, the sodium methoxide was deactivated by adding 30 g of "Tonsil Optimum FF" (acidic alumina, Messrs. Sid-Chemie). About 550 g of methyltrimethoxysilane were subsequently removed by distillation at temperatures up to 150° C. A residue consisting of 380 g was removed from lower boiling components in a thin-film evaporator at 170° C. and at 100 Pa (abs.).

About 300 g of an organosilane of the formula

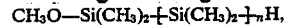

$$CH_3O-Si(CH_3)_2-[Si(CH_3)_2]_n-H,$$

where n has an average value between 3 and 6, a viscosity of 80 $mm^2/s$ at 25° C. and a density of 0.965 $g/cm^3$ were recovered.

Preparation of organopolysilane (B):

A mixture containing 700 g (3.61 mol) of 1,1,2-trimethyl-1,2,2-trimethoxydisilane, 300 g (1.43 mol) of 1,2-dimethyl-1,1,2,2-tetramethoxydisilane, 20 g of dimethylmethoxysilane and 2 g of sodium methoxide warmed after reaching a temperature of 25° C. rapidly to about 90° C. without the addition of external heat. The resultant mixture was heated to 200° C. over a period of one hour, while 760 g of a mixture containing dimethyldimethoxysilane and methyltrimethoxysilane was distilled off. The residue (262 g) was dissolved in 250 ml of toluene, and the lower boiling components were removed from the solution in a thin-film evaporator at 250° C. and at a pressure of 100 Pa (abs.). About 200 g of an organopolysilane which had an average of 40 silicon atoms per molecule and softened to form a melt between 35° C. and 70° C. were recovered.

Preparation of the organopolysiloxane base material (C):

Eighty parts by weight of an $\alpha,\omega$-bis-dimethylvinylsiloxypolydiorganosiloxane having a viscosity of $4\times10^6$ mPa.s at 25° C., and containing 99.5 mol percent of dimethylsiloxy groups and 0.5 mol percent of methylvinylsiloxy groups, were mixed in a kneader with 20 parts by weight of a finely divided hydrophobic silica having a BET surface area of 250 $m^2/g$.

Preparation of the organopolysiloxane base material (D): 7 One hundred parts by weight of an $\alpha$-$\omega$-bis-trimethyl-siloxypolydiorganosiloxane having a viscosity of $10^7$ mPa.s at 23° C., and containing 99.88 mol percent of dimethylsiloxy groups and 0.12 mol percent of methylvinylsiloxy groups, were mixed with 5 parts by weight of an $\alpha,\omega$-bis-hydroxypolydimethylsiloxane having a viscosity of 40 $mm^2/s$ at 23° C. and 40 parts by weight of a finely divided, pyrogenically prepared silica having a BET surface area of 200 $m^2/g$, in which 60 percent of the surface area had been rendered hydrophobic by treatment with dimethyldichlorosilane.

Example 1:

About 0.5 g of organosilane (A) were added to 50 g of the organopolysiloxane base material (C) in a roll mill, and then circular discs having a thickness of 0.5 cm and a diameter of 3 cm were formed from this mixture. The discs were kept for 2 hours at 200° C. in a drying oven on aluminum foil. The discs were then vulcanized to form a colorless, clear and bubble-free elastomer.

Comparison example 1:

The procedure of Example 1 was repeated, except that organosilane (A) was omitted. After the temperature treatment (2 hours at 200° C.), the discs were still unvulcanized.

Examples 2–4 and comparison examples 2 and 3:

(a) About 100 parts by weight of the organopolysiloxane base material (D) were mixed in a roll mill with each of the amounts (parts by weight) of vulcanizing agents [50 percent by weight suspension of dibenzoyl peroxide in dimethylpolysiloxane or organopolysilane (B)] indicated in the following table.

In comparison example 3, a polycarbosilane of the general formula

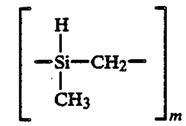

in which m has values of from 3 to 10 and has a melting point of about 90° C. was substituted for the organopolysiloxane (B). This compound was prepared in accordance with German Patent Application DE-A 2,618,246 (published November 11, 1976, S. Yajima et al.) by reacting dimethyldichlorosilane with sodium and then subsequently treated in an autoclave at 450 to 470° C. Comparison example 3 thus substantially corresponds to the teaching of Japanese Patent Application 60-120-755 cited heretofore.

(b) One part of each mixture whose preparation was described in (a) above was extruded, with the temperature of the heating channel of the extruder being 300° C. and the residence time of the mixture in the heating channel was 2 minutes. Elastomers were obtained in each case and were subsequently post cured for 4 hours at 200° C. in hot air. The appearance of these extruded post-treated elastomers are shown in the following table.

(c) A part of each mixture whose preparation was described in (a) above was vulcanized for 10 minutes by compression molding at a pressure of 10 MPa (abs.) and a temperature of 135° C. to form sheets and then subsequently post cured for 4 hours at 200° C. in hot air. Physical tests were carried out on test specimens cut from these sheets. The following table shows the values obtained for the Shore A hardness, the tensile strength, the tear strength, the rebound resilience and discoloration of the elastomeric sheets.

TABLE

| Additives to 100 parts of the organopolysiloxane base material (D) | Example Number | | | Comparison Example Number | |
|---|---|---|---|---|---|
| | 2 | 3 | 4 | 2 | 3 |
| 50% suspension of dibenzoyl peroxide in dimethylpolysiloxane | 1 | 1 | 0.5 | 1 | 1 |
| Organopolysilane (B) | 0.7 | 0.3 | 0.7 | — | — |
| Polycarbosilane | — | — | — | — | 0.5 |
| Tests | | | | | |
| Hardness (Shore A) | 54 | 51 | 50 | 53 | 50 |
| Tensile strength ($N/mm^2$) | 10.5 | 10.2 | 10.7 | 11.1 | 9.7 |
| Elongation at break (%) | 630 | 730 | 610 | 610 | 640 |
| Tear strength (N/mm) | 26 | 28 | 29 | 22 | 26 |
| Rebound resilience (%) | 32 | 27 | 29 | 33 | 33 |
| Coloration of the sheets | 1 | 1.5 | 1 | 3 | 2 |

TABLE-continued

| Additives to 100 parts of the organopolysiloxane base material (D) | Example Number | | | Comparison Example Number | |
|---|---|---|---|---|---|
| | 2 | 3 | 4 | 2 | 3 |
| according to the iodine color scale (DIN 6162) | | | | | |
| Appearance of the extruded samples. | Bubble-free transparent | Bubble-free transparent | Occasional bubbles tranparent | Foam turbid | Many bubbles |

What is claimed is:

1. Heat-vulcanizable organopolysiloxane compositions containing an organopolysiloxane and an organo(-poly)silane of the formula $$R'_2R'''Si-[(SiR'''R'')_p(SiR''')_q]X \quad (II)$$

where R′ is selected from the group consisting of monovalent alkyl, alkenyl and aryl groups and monovalent halogenated alkyl, alkenyl and aryl groups having from 1 to 18 carbon atoms; R″ is an alkyl group having from 1 to 18 carbon atoms; R‴ is selected from the group consisting of $C_1$- to $C_6$-alkoxy groups and R′ radicals; X is selected from the group consisting of a hydrogen atom and a $C_1$- to $C_6$-alkoxy group, p and q each are integers whose sum is at least 1, in which the organo(-poly)silane is present in the composition in an amount of from 0.01 to 10 parts by weight per 100 parts by weight of the organopolysiloxane.

* * * * *